United States Patent [19]

Idesawa

[11] Patent Number: 4,757,882
[45] Date of Patent: Jul. 19, 1988

[54] MECHANICALLY-OPERATED DRUM BRAKE DEVICE

[75] Inventor: Isao Idesawa, Nagano, Japan

[73] Assignee: Nissin Kogyo Kabushiki Kaisha, Nagano, Japan

[21] Appl. No.: 928,597

[22] Filed: Nov. 6, 1986

Related U.S. Application Data

[63] Continuation of Ser. No. 686,813, Dec. 27, 1984, abandoned.

[30] Foreign Application Priority Data

Dec. 27, 1983 [JP] Japan .................. 58-204911[U]
Dec. 28, 1983 [JP] Japan .................. 58-205118[U]

[51] Int. Cl.⁴ ............................................. F16D 51/22
[52] U.S. Cl. .................................. 188/78; 188/106 A; 188/328; 192/75; 192/99 B
[58] Field of Search ............... 188/78, 326, 327, 328, 188/325, 331, 333, 106 A, 106 F, 79.5 P; 192/75, 99 B

[56] References Cited

U.S. PATENT DOCUMENTS

| 1,940,022 | 12/1933 | Schnell | 188/78 X |
| 2,118,188 | 5/1938 | Gallup | 188/106 A |
| 2,758,680 | 8/1956 | Rabe | 188/78 X |
| 2,945,564 | 7/1960 | House et al. | 188/328 |
| 3,027,981 | 4/1962 | Erickson | 188/331 |
| 4,018,312 | 4/1977 | Muramoto et al. | 188/325 X |

FOREIGN PATENT DOCUMENTS

| 44-31653 | 12/1969 | Japan . | |
| 58-51464 | 11/1983 | Japan . | |
| 984312 | 2/1965 | United Kingdom . | |
| 1287884 | 9/1972 | United Kingdom | 188/79.5 P |
| 1379136 | 1/1975 | United Kingdom | 188/327 |

Primary Examiner—George E. A. Halvosa
Attorney, Agent, or Firm—Armstrong, Nikaido, Marmelstein & Kubovcik

[57] ABSTRACT

A mechanically-operated drum brake device which comprises a pair of brake shoes each coming in contact with an anchor at one end portion on the same side and engaging with a floating type actuator and a brake lever rotatably supported on the actuator at their other end portions, respectively. There is provided structure for holding in place the brake shoes and the actuator relative to a back plate at a predetermined distance therebetween in the axial direction of a brake drum. There is also provided a stop member to control the inward contracting movement of the brake shoes when the brake is released.

6 Claims, 2 Drawing Sheets

MECHANICALLY-OPERATED DRUM BRAKE DEVICE

This application is a continuation of application Ser. No. 686,813 filed Dec. 27, 1984, now abandoned.

BACKGROUND OF THE INVENTION

1. Field of the Invention

This invention relates to a mechanically-operated drum brake device provided with a floating type actuator.

2. Description of the Prior Art

There is conventionally used a mechanically-operated drum brake device of the type having a so-called floating type actuator adapted for expanding and actuating a pair of brake shoes, the actuator being usually held at a position floating from the surface of a back plate other than at the time of braking in such a manner as to be suspended between end portions of webs of both the brake shoes in order to prevent the actuator from sticking to the back plate or operating defectively due to rust caused by incoming water or other foreign matter. However, since such floating type actuator is mounted in a floating state, when a brake wire for rotating a brake lever journaled in the actuator is pulled in a direction deviating from the normal turning path of the brake lever due to a position whereat the equipment is disposed or other reason, the brake lever and the actuator are turned slantingly at the time of braking operation, which may be a reason for causing an inproper braking operation.

Further, in case this type of floating actuator is driven by a reaction force caused from turning movement of the brake lever journaled rotatably on the actuator, since a turning shaft for the brake lever as provided on the actuator is positioned closer to the back plate than the engaging position of a working part of the brake lever with the brake shoes and also the engaging position of the actuator with the shoes, that is, near a position whereat the brake lever and the brake wire are coupled to each other, the reaction force caused by turning of the brake lever works so as to float that side of the actuator which engages a brake shoe, thus tends to force the brake shoe to float, which may result in an inconvenient braking operation.

SUMMARY OF THE INVENTION

This invention has been made to remove the defects mentioned above, and its object is to provide a mechanically-operated drum brake device wherein an accurate braking operation is obtainable through preventing a floating type actuator from moving slantingly and floating and thereby holding the actuator and brake shoes at a predetermined distance to a back plate at all times in the axial direction of the brake drum.

In order to attain the above-mentioned object, according to this invention, there is provided a mechanically-operated drum brake device including back plate, a pair of brake shoes provided inside the back plate each having one end on the same side brought in contact with an anchor, a floating type actuator engaging with other end of one of the brake shoes, and a brake lever extending through the back plate to an outside thereof, the brake lever engaging with other end of the other brake shoe and being supported rotatably on the actuator, the actuator being driven by turning operation of the brake lever to extend the brake shoes for braking action, wherein a means is provided for holding the actuator and brake shoes in place in the axial direction of the brake drum relative to the back plate at predetermined intervals therebetween.

According to one aspect of the invention, the above means comprises a first brake shoe engaging groove provided on the actuator at a portion thereof engaging with the other end of the one brake shoe, an actuator engaging groove provided on the other end of the one brake shoe and engaging with the first brake shoe engaging groove, a second brake shoe engaging groove provided on the brake lever at a portion thereof engaging with the other end of the other brake shoe, and a brake lever engaging groove provided on the other end of the other brake shoe and engaging with the second brake shoe engaging groove.

According to another aspect of the invention, the actuator has a float-preventing arm working as the above means, which is provided with an abutment part extending through the back plate to an outside of the plate and capable of abutting against the outside of the back plate.

With the above arrangement, despite the formation of the actuator as a floating type, positions of the actuator and associated brake shoes relative to the back plate are kept in the axial direction of a brake drum at predetermined intervals therebetween at all times so that a braking operation will never invite a flotation of the actuator or inclining of the brake shoes, and thus the brake shoes are prevented from wearing out partially or one-sidedly, realizing a stable and accurate braking action at all times.

The above and other objects, features and advantages of the invention will be elucidated from the following detailed description of a preferred embodiment described with reference to the accompanying drawings.

BRIEF DESCRIPTION OF THE DRAWINGS

The drawings represent one preferred embodiment of a mechanically-operated drum brake device according to this invention, wherein.

DETAILED DESCRIPTION OF PREFERRED EMBODIMENT

A mechanically-operated drum brake device which is given in one preferred embodiment of this invention will be described hereunder with reference to the drawings.

Figure 1:
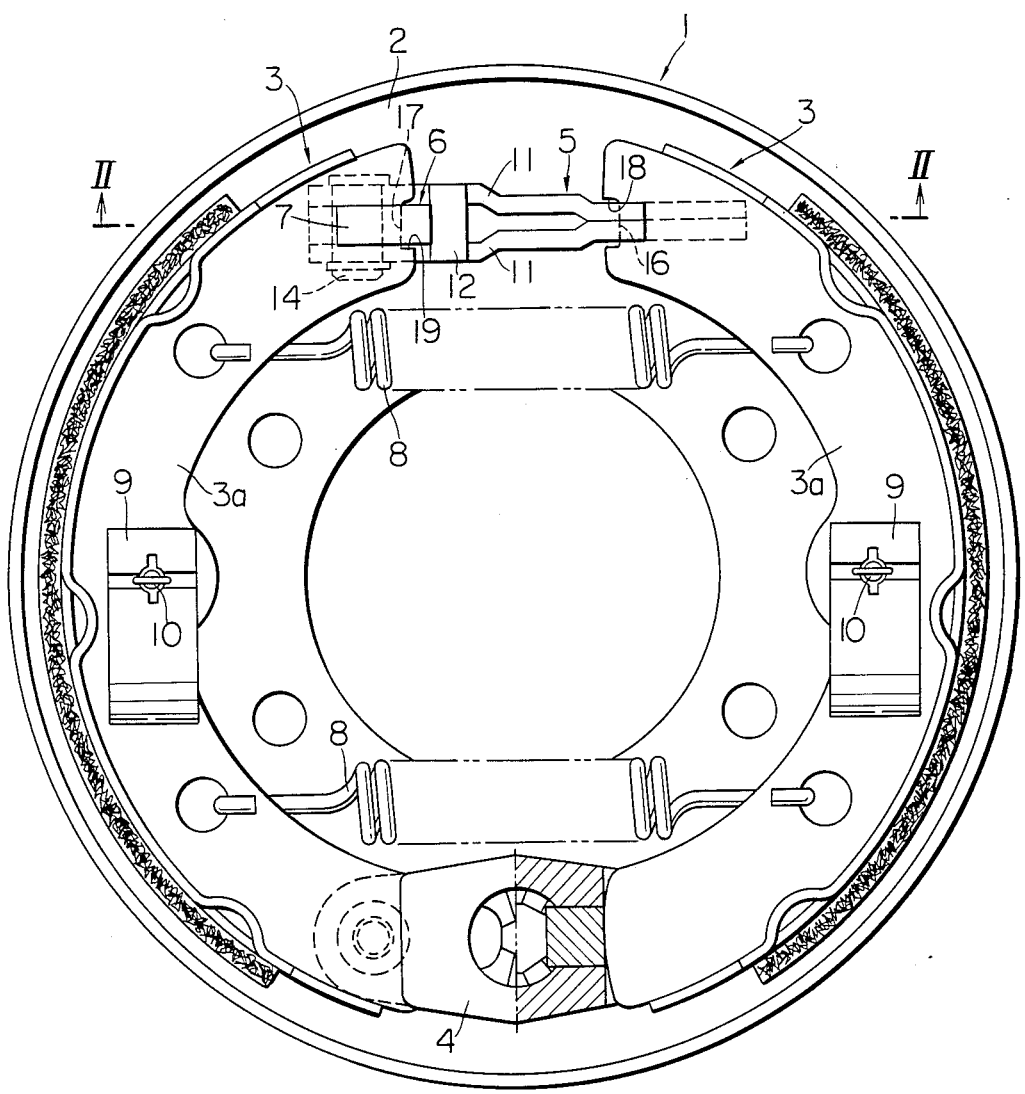
FIG. 1 is a front view.

A drum brake device 1 has a back plate 2, and a pair of brake shoes 3, 3 are provided on an inside of the back plate 2. Webs 3a, 3a of the brake shoes 3, 3 are in contact with an anchor 4 fixed on the back plate 2 at their one ends on the same side, namely lower end portions in FIG. 1, and their other end portions positioned upward in FIG. 1 are in engagement with a floating type actuator 5 and a working end 7 of a brake lever 6 journaled rotatably on the actuator 5, respectively. Two return springs 8, 8 are laid under tension between the webs 3a, 3a so that the webs 3a, 3a are biased inward, or in a contracting direction, by the springs 8, 8. The webs 3a, 3a are further retained swingably and resiliently onto the back plate 2 by shoe hold-down pins 10, 10 through shoe hold springs 9, 9.

Figure 2:
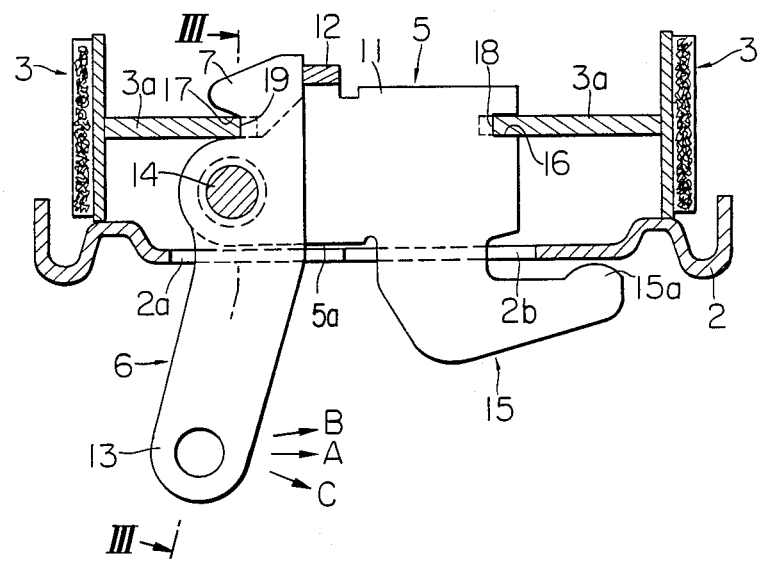
FIG. 2 is a sectional view taken on line II—II of FIG. 1.

Then, the floating type actuator 5 is constituted of a pair of side plates 11, 11 united together at one end and having their other ends separated from each other so as to expand their distance stepwise, these side plates 11, 11 having side surfaces, as counter to the back plate 2, coupled together in parallel manner by a bridge or stop member 12 at most separated portions. The united end portion of the actuator 5 is in engagement with an end portion of the web 3a of one brake shoe 3, and on the other end of the actuator 5 the brake lever 6 is journaled rotatably through a turning shaft or pivot 14 between both the separated side plates 11, 11. The brake lever 6 has its working end 7 engaging with an end portion of the web 3a of the other brake shoe 3, and further an operating arm 13 of the brake lever 6 is provided to extend outside of the back plate 2 through a hole 2a formed in the back plate 2. As best shown in FIG. 2, the working end 7 of the brake lever 6 is in contact with the bridge 12 of the actuator 5 on a side opposite to the side where the end 7 engages the shoe web 3a, thus restricting the inward contracting movement of the brake shoe 3 which is biased inward by the return springs 8 when the brake is released.

Figure 3:
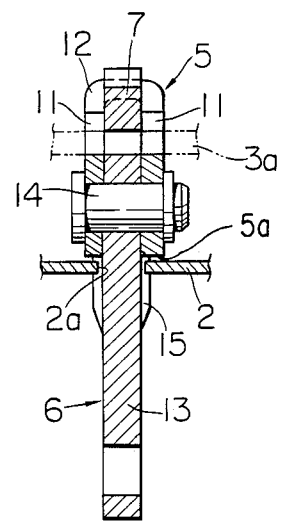
FIG. 3 is a sectional view taken on line III—III of FIG. 2.

Then, the actuator 5 disposed between one end of each of the brake shoes 3, 3, of which the other ends are placed in abutment against the anchor 4 as mentioned above, engages at its united end portion with the end portion of the adjacent shoe web 3a and at its other end portion rotatably supports the brake lever 6 which is in turn in engagement with the end portion of the other shoe web 3b, thus being suspended and so retained swingably inside the back plate 2. As shown in FIG. 2, the actuator 5 is provided at a lower part of the united end portion thereof with an integral float-preventing arm 15 extending through a second hole 2b in the back plate 2. More specifically, the float-preventing arm 15 extends in the direction (indicated by an arrow A) of rotation of the brake lever 6 for braking, and an abutment part 15a capable of abutting against an outside surface of the back plate 2 is formed on the tip end thereof. An abuttable portion 5a of actuator 5 is subject to abutting against an inside surface of the back plate 2, as shown in FIGS. 2 and 3.

Further, first and second brake shoe engaging grooves 16, 17 are formed at parts of the united end portion of the actuator 5 and the working end 7 of the brake lever 6 rotatably supported on the actuator 5 which engage with the webs 3a, 3a of the brake shoes 3, 3, whereas an actuator engaging groove 18 is formed at one of the shoe webs 3a, 3a for engagement with the first brake shoe engaging groove 16 on the actuator 5 and a brake lever engaging groove 19 is formed at the other shoe web 3a for engagement with the second brake shoe engaging groove 17 on the brake lever 6. In the illustrated embodiment, as shown in FIGS. 2 and 3, the planes of the brake shoe webs 3a are at right angles to the planes of the actuator 5 and the brake lever 6 so that the brake shoe engaging grooves 16, 17 are formed on the actuator 5 and the brake lever 6 such that they come to positions offset by 90° from the associated engaging grooves 18, 19 at the time of engagement. Thus, the first and second brake shoe engaging grooves 16, 17 are fitted and so placed in engagement with the corresponding engaging grooves 18, 19 so as to hold at their both side surfaces both sides of the shoe webs 3a, 3a and in turn the engaging grooves 18, 19 are fitted and put into engagement with the corresponding engaging grooves 16, 17 so as to hold at their both side surfaces the respective both sides of the actuator 5 and the brake lever 6. Such particular engaging structure is effective to regulate a slantwise or inclining movement of the actuator 5.

These engaging grooves can be formed, needless to say, in other states than that of the illustration.

Next will be described an operation of the mechanically-operated drum brake device of the above embodiment.

When the operating arm 13 of the brake lever 6 as extending outside the back plate 2 is turned in the braking direction indicated by the arrow A, the brake shoe 3 engaging with the working end 7 is pushed outward by the brake lever 6 and simultaneously the actuator 5 rotatably supporting the brake lever 6 moves in the direction indicated by the arrow A under a reaction force caused at the time of turning of the brake lever 6, pushing outward the other brake shoe 3 engaging the actuator 5 accordingly, and thus the paired brake shoes 3, 3 expand and come into sliding friction with a brake drum (not shown) thereby to effect a braking action.

Since the portion of the brake lever 6 as journaled by the turning shaft 14 of the actuator 5 is positioned closer to the back plate 2 than the position where the lever 6 engages the shoe web 3a, or on the side closer to a position where the brake lever 6 and an inner wire are coupled together, the actuator 5 is subjected, at the time of braking action, to a force pushing the brake shoe 3 engaging therewith in the expanding direction and also to a force causing the actuator 5 to move away from the back plate 2. However, the abutment part 15a of the float-preventing arm 15 provided integrally on the lower part of the united end portion of the actuator 5 then comes in contact with the outside surface of the back plate 2, whereby floating of the actuator 5 is effectively prevented and thus undesirable displacement of the brake shoe 3 in an axial direction of the brake drum is suppressed to secure a proper braking action. Also, the abutment portion 5a prevents undesirable displacement in the opposite axial direction.

Further, in case a tensile force of the brake wire is applied to the brake lever 6 in the direction deviating from the normal turning path of the lever, for example, in the direction indicated by an arrow B or C in FIG. 2, there may arise a force to turn the actuator 5 slantingly at the time of turning movement of the brake lever 6. However, since the engaging grooves 16, 17, 18, 19 on the actuator 5, the brake lever 6 and the webs 3a, 3a of the brake shoes 3, 3, which are in fitting engagement with each other, hold both sides of the associated members by the groove side surfaces, respectively, the actuator 5 is prevented effectively from turning slantingly by the brake shoes 3, 3 through engagement of the grooves, and a more reliable and proper braking action is secured consequently.

Incidentally, displacement of the shoes in response to wear of their lining can be permitted when providing a clearance between the engaging grooves 18, 19 of the shoe webs 3a, 3a and the engaging grooves 16, 17 of the actuator 5 and the brake lever 6.

What is claimed is:

1. A mechanically-operated drum brake device comprising;

a back plate;

a pair of brake shoes disposed inside said back plate, one end of each of said brake shoes being in abutment against an anchor; and a floating type actuator located adjacent to and internally of said back plate and engaging the other end of one brake shoe;

a brake lever pivotally supported for turning movement on a shaft carried by said actuator inside said back plate, said brake lever having a working end inside said back plate engaging the other end of the other brake shoe and an operating arm extending outside said back plate, said operating arm of said brake lever being adapted to drive said actuator by pivoting the lever to cause said brake shoes to be expanded for braking action;

said actuator further including a float-preventing arm which extends through said back plate and has an abutment part formed at an end thereof which is normally spaced from but is capable of abutting against an outside surface of said back plate to thereby limit movement of said actuator and said brake shoes in an axial direction relative to said back plate;

said actuator further including a stop member adapted to engage said brake lever when pivoting on said turning shaft to a brake release condition of said brake device whereby said actuator is maintained in a predetermined position in the floating state by engagement of said stop member with said brake lever and inward retraction of said pair of brake shoes in the brake release condition is restricted by said actuator.

2. The device according to claim 1, wherein said actuator is further provided with an abutment portion capable of being abutted against an inside surface of the back plate to limit movement of said actuator and said brake shoes in the other axial direction relative to said back plate.

3. The device according to claim 1, wherein said actuator comprises a pair of side plates which are united together at one end for engagement with said other end of said one brake shoe and which are separated from each other at their other ends and are connected by means of a bridge, the bridge serving as said stop member.

4. The device aocording to claim 3, wherein said stop member is located on said actuator further from said back plate than the turning shaft and the engaging portion between said brake lever and said other brake shoe.

5. The device according to claim 1, wherein said brake lever, said actuator and said pair of brake shoes are provided with engaging grooves, these engaging grooves engaging each other to hold said actuator against inclining in the axially direction of the brake drum during operation of the device.

6. The device according to claim 1 wherein said stop member is located a distance from said shaft which is greater than the distance between the point of engagement of said working end of said brake lever and said shaft.

* * * * *